US010298820B2

(12) United States Patent
Hsu et al.

(10) Patent No.: US 10,298,820 B2
(45) Date of Patent: May 21, 2019

(54) CAMERA MODULE WITH EMBEDDED COMPONENTS

(71) Applicant: Apple Inc., Cupertino, CA (US)

(72) Inventors: Ya Wen Hsu, San Francisco, CA (US); Douglas S. Brodie, Los Gatos, CA (US); Steven Webster, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/673,253

(22) Filed: Aug. 9, 2017

(65) Prior Publication Data

US 2018/0048796 A1 Feb. 15, 2018

Related U.S. Application Data

(60) Provisional application No. 62/373,160, filed on Aug. 10, 2016.

(51) Int. Cl.
*H04N 5/225* (2006.01)
*G02B 13/00* (2006.01)
(Continued)

(52) U.S. Cl.
CPC ............. *H04N 5/2254* (2013.01); *G02B 7/08* (2013.01); *G02B 7/09* (2013.01); *G02B 13/001* (2013.01);
(Continued)

(58) Field of Classification Search
CPC .... H04N 5/2254; H04N 5/2253; H04N 5/235; H04N 3/155; G02B 7/09; G02B 13/001; G02B 27/646; G03B 13/36; G03B 17/14
See application file for complete search history.

(56) References Cited

U.S. PATENT DOCUMENTS 7,110,033 B2  9/2006  Miyake
7,583,309 B2  9/2009  Aizawa et al.
(Continued)

FOREIGN PATENT DOCUMENTS

EP    1398832      3/2004
JP    2011134777   7/2011
JP    2014013825   1/2014

OTHER PUBLICATIONS

International Search Report and Written Opinion for PCT/US2017/046332, dated Oct. 19, 2017, Apple Inc., pp. 1-17.

*Primary Examiner* — Nhan T Tran
(74) *Attorney, Agent, or Firm* — Robert C. Kowert; Meyertons, Hood, Kivlin, Kowert & Goetzel, P.C.

(57) ABSTRACT

A camera module includes a lens barrel holder and a substrate. The substrate may include a circuit board embedded in the substrate. The circuit board may include multiple electrical components mounted to a first side of the circuit board, where the electrical components are not exposed outside. The circuit board may also include multiple electrical connections on another side of the circuit board, an image sensor mounted to the electrical connections, and an upper opening in the circuit board for light to pass through. The substrate may include an upper opening configured to receive, at least partially inside the substrate, a lower portion of the lens barrel holder. The substrate may include a lower opening connected to the upper opening and configured to receive the image sensor. The lens barrel holder may include extensions, such as a flange or tabs, and an adhesive bond between the extensions and the substrate.

25 Claims, 10 Drawing Sheets

(51) Int. Cl.
*G02B 27/64* (2006.01)
*G02B 7/09* (2006.01)
*G03B 13/36* (2006.01)
*G03B 17/14* (2006.01)
*H04N 3/14* (2006.01)
*H04N 5/235* (2006.01)
*G02B 7/08* (2006.01)

(52) U.S. Cl.
CPC ........... *G02B 27/64* (2013.01); *G02B 27/646* (2013.01); *G03B 13/36* (2013.01); *G03B 17/14* (2013.01); *H04N 3/155* (2013.01); *H04N 5/2253* (2013.01); *H04N 5/235* (2013.01)

(56) References Cited

U.S. PATENT DOCUMENTS

| | | | |
|---|---|---|---|
| 9,392,147 B2 | 7/2016 | Lee | |
| 2001/0050721 A1* | 12/2001 | Miyake | H04N 5/2254 348/374 |
| 2004/0095501 A1* | 5/2004 | Aizawa | H04N 5/2253 348/340 |
| 2007/0146534 A1* | 6/2007 | Kim | H04N 5/2254 348/340 |
| 2012/0141114 A1* | 6/2012 | Gooi | H04N 5/2253 396/529 |
| 2012/0265416 A1 | 10/2012 | Lu et al. | |
| 2013/0128106 A1 | 5/2013 | Tam et al. | |
| 2015/0256725 A1 | 9/2015 | Jiang et al. | |
| 2016/0182787 A1* | 6/2016 | Sesti | G02B 7/025 156/64 |

\* cited by examiner

CAMERA MODULE WITH EMBEDDED COMPONENTS

This application claims benefit of priority to U.S. Provisional Application No. 62/373,160, filed Aug. 10, 2016, titled "Camera Module with Embedded Components", which is hereby incorporated by reference in its entirety.

BACKGROUND

Portable electronic devices, such as mobile phones, typically include a camera module that utilizes an image sensor to capture images. Conventional camera modules may include various combinations of magnets or motors to physically move the position of a lens, thereby adjusting the object focal distance of the lens to allow objects at different distances to be in sharp focus at the image plane of an image sensor. Consequently, conventional camera modules may be susceptible to mechanical failures and/or may require a large amount of physical space.

Demands on improvements to performance of such cameras are constant, as are demands for continued miniaturization, given the added features and applications added to such mobile devices. For example, miniaturized cameras in mobile devices do not typically have enough physical space available for bulky optical components. Furthermore, as the size of mobile devices shrinks, the space available for camera components also decreases.

Moreover, the complexity of the manufacturing process for camera modules also increases as the physical footprint of the camera module decreases. Camera modules that include a large number of separate components (e.g., a large bill of materials) are expensive and difficult to manufacture because each of the numerous components in the bill of materials must be tracked, carried in inventory, and assembled during an assembly process with a large number of steps. As the complexity of the camera module assembly process rises, so too does the risk of errors during assembly. For example, parts can get lost, run out of stock, and/or inadvertently be pieced together incorrectly.

SUMMARY

A camera module and method of manufacturing a camera module are disclosed. In one embodiment, a camera module may include a lens barrel holder, an image sensor, and a substrate. In an embodiment, the substrate may include a circuit board embedded in the substrate. In some embodiments, the circuit board may include multiple electrical components mounted to a first side of the circuit board, where the electrical components are not exposed outside. The circuit board may also include multiple electrical connections on another side of the circuit board configured to mount the image sensor to the circuit board and an upper opening in the circuit board for light to pass through. In one embodiment, the substrate may include an upper opening configured to receive, at least partially inside the substrate, a lower portion of the lens barrel holder. In an embodiment, the substrate may include a lower opening connected to the upper opening and configured to receive the image sensor.

In one embodiment, the lens barrel holder may include one or more extensions and an adhesive bond between the one or more extensions and the substrate. In various embodiments, the one or more extensions may include a flange extending laterally around an outer circumference of the lens barrel holder or multiple tabs extending from respective outer sides of the lens barrel holder. In an embodiment, the multiple electrical components may be mounted in groups at respective corners of the circuit board. In one embodiment, the upper opening may include a circular hole, and the lower portion of the lens barrel holder may include a cylindrical portion configured to fit inside the circular hole. In an embodiment, the lower opening may include a rectangular hole, and light may pass through the lens barrel holder and the rectangular hole to the reach image sensor. In some embodiments, the lens barrel holder may be configured to hold multiple optical elements, which may include one or more lens elements and an optical filter. The optical filter may include an element in the bottom of the lens barrel holder or a coating material on the bottom of the lens barrel holder. In various embodiments, the circuit board may include one or more external electrical connections on a portion of the circuit board configured to extend outside the substrate.

In an embodiment, a multifunction device may include a central processing unit (CPU) and a memory coupled to the CPU. The memory may include program instructions executable by the CPU to control operation of a camera. In one embodiment, a camera module coupled to the CPU of the multifunction device may include a lens barrel holder, an image sensor, and a substrate. In an embodiment, the substrate may include a circuit board embedded in the substrate. In some embodiments, the circuit board may include multiple electrical components mounted to a first side of the circuit board, where the electrical components are not exposed outside. The circuit board may also include multiple electrical connections on another side of the circuit board, an image sensor mounted to the electrical connections, and an upper opening in the circuit board for light to pass through. In one embodiment, the substrate may include an upper opening configured to receive, at least partially inside the substrate, a lower portion of the lens barrel holder. In an embodiment, the substrate may include a lower opening connected to the upper opening and configured to receive the image sensor.

In an embodiment, a method of manufacturing a camera module may include forming a substrate, which may include embedding a circuit board in the substrate. In one embodiment, the circuit board may include multiple electrical components mounted on a first side of the circuit board. The electrical components may not be exposed outside. The circuit board may also include multiple electrical connections on another side of the circuit board and an opening in the circuit board for light to pass through. In an embodiment, the method may include forming an upper opening in the substrate configured to receive, at least partially inside the substrate, a lower portion of the lens barrel holder. In one embodiment, the method may include forming, in the substrate, a lower opening connected to the upper opening and configured to receive an image sensor. In an embodiment, the method may include mounting the image sensor in the lower opening of the substrate and to the electrical connections of the circuit board. In some embodiments, the method may include mounting a lower portion of the lens barrel holder in the upper opening. The lens barrel holder may be configured for light to pass through the lens barrel holder to the image sensor.

In some embodiments, mounting the lower portion of the lens barrel holder in the upper opening may include an active alignment process. In various embodiments, the active alignment process may include capturing, by the image sensor, a test image. The active alignment process may include determining, based at least in part on the test image, a position of the lens barrel holder to focus the test image (e.g., a position that results in a best focus of a test image pattern). The active alignment process may include aligning the lens barrel holder within the upper opening of the substrate based on the determined position, and performing an initial cure of bonding material on the lens barrel holder in proximity to the upper opening. In an embodiment, the method of manufacturing the camera module may include performing, subsequent to the active alignment process, a secondary cure of the bonding material. The secondary cure may include a heat-based curing process. In one embodiment, performing the initial cure may include performing an ultraviolet (UV) curing process. In some embodiments, mounting the lower portion of the lens barrel holder in the upper opening may include bonding one or more extension(s) of an outer surface of the lens barrel holder to the substrate. The one or more extension(s) may include a flange extending laterally around an outer circumference of the lens barrel holder, or multiple tabs extending from respective outer sides of the lens barrel holder. In one embodiment, forming the substrate may include an injection molding process (e.g., plastic injection molding). The injection molding process may include embedding the circuit board and the multiple electrical components in the substrate. In some embodiments, the electrical components may be in groups at respective corners of the circuit board.

In one embodiment, a camera module may include an image sensor, a substrate, and a lens barrel holder. In an embodiment, the substrate may include an upper opening and a lower opening configured to receive the image sensor. In some embodiments, the lens barrel holder may include a lower portion of the lens barrel holder configured to fit at least partially inside the upper opening of the substrate, and one or more extensions configured to extend on top of the substrate from a portion of the lens barrel holder above the lower portion.

Figure 1:
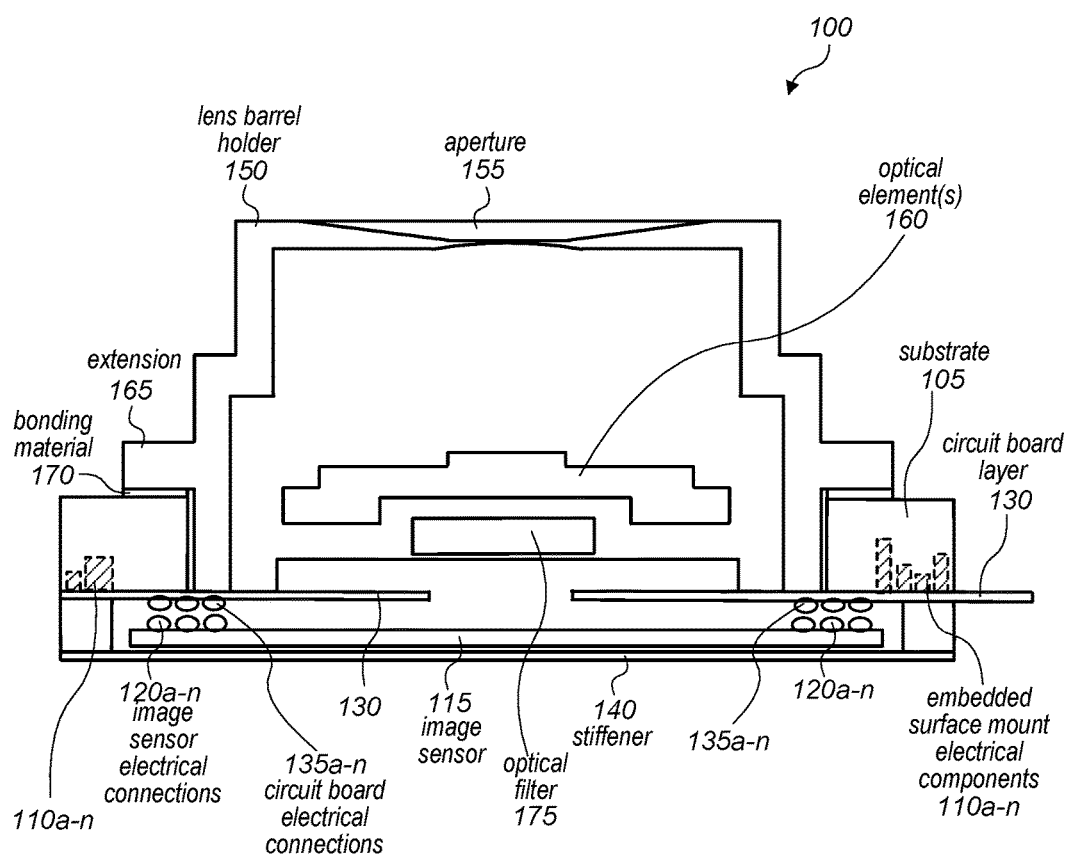
FIG. 1 is a logical block diagram illustrating a cross-sectional view of an example camera module, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof. It will also be understood that the term "and/or" as used herein refers to and encompasses any and all possible combinations of one or more of the associated listed items.

DETAILED DESCRIPTION

A camera module or other image processing device may implement many different techniques or components to focus light captured by an image sensor. In one embodiment, a camera module may include a lens configured to change an optical focus of the camera module. In an embodiment, the lens may be positioned relative to an optical axis (e.g., along the optical axis). In an embodiment, the camera module may include a substrate that is in turn connected to one or more controllers (e.g., processors) via a circuit board (e.g., a flexible circuit board). In some embodiments, the circuit board may be embedded within the substrate (e.g., as a layer of the substrate), and the substrate may include a lower opening shaped to allow an image sensor to fit inside the substrate and be mounted to one or more electrical connections on a bottom of the circuit board. In one embodiment, the image sensor may be flip chip mounted to the bottom of the circuit board. For example, the circuit board may include one or more circuit board electrical connections on a bottom side of the surface board that correspond to one or more respective image sensor electrical connections on a top surface of the image sensor. The electrical connections between the image sensor and the circuit board may include solder balls, electrical bonding pads, and/or other electrical connections.

In an embodiment, the circuit board may have an opening (e.g., a central rectangular hole or a central hole of another shape) and/or an optically transparent material in a central area, such that light may pass through the circuit board to the image sensor. In some embodiments, the circuit board may include multiple surface mount electrical components (e.g., capacitors, inductors, resistors, and/or other electrical components) mounted to one or more electrical connection pads on a top surface of the circuit board. In an embodiment, the electrical components may be arranged in groups, and the groups may be located near different corners of the circuit board, such that the groups of electrical components mounted to the circuit board are not exposed outside and do not interfere with the optical opening near the central area of the circuit board.

In one embodiment, a lens barrel of the camera module may include one or more optical elements, such as one or more lenses (e.g., a lens stack) and an optical filter (e.g., a Bayer color filter) that are embedded inside the lens barrel. In an embodiment, the lens barrel may be included within a lens barrel holder. In some embodiments, a lower portion of the lens barrel holder may be configured to fit at least partially inside an upper opening of the substrate, such that light may pass through the lens barrel holder, through the one or more optical elements, and through the opening in the circuit board to the image sensor. In an embodiment, the lens barrel holder may include one or more extensions configured to extend on top of the substrate from an upper portion of the lens barrel holder above the lower portion. For example, the lower portion of the lens barrel holder may be configured to fit inside an upper opening of the substrate, and an upper portion of the lens barrel holder that extends upward above the substrate may also include one or more extensions that extend laterally outward on top of the substrate (i.e., horizontally along a top surface of the substrate) from the wall of the lens barrel holder.

In some embodiments, a camera module with embedded components may include 4 components: a lens barrel holder, which itself may include embedded optical components, a substrate, which includes embedded components, an image sensor, and a stiffener (e.g., a base and/or grounding plate at the bottom of the camera module). In an embodiment, the substrate may include multiple layers of a polymer material. For example, the substrate may include 6 layers in some embodiments. The top 2 layers may include a circular hole configured to fit a lower portion of the lens barrel holder in the substrate. A circular bond line of adhesive (e.g., epoxy or glue) may affix an extension of the lens barrel holder to the top of the substrate. The bonding material may form an annular ring, thereby ensuring an even distribution of bonding material along the extension(s) of the lens barrel holder and thus providing a stable and level alignment of the lens barrel holder in the upper opening of the substrate. The bottom 4 layers may include a rectangular hole configured to receive the image sensor to be mounted to the embedded circuit board in the substrate. One of the bottom 4 layers may include the embedded circuit board. In addition to the electrical connections between the image sensor and the bottom of the circuit board, a rectangular bond line of adhesive may affix the image sensor to the substrate and/or to the circuit board. In other words, bonding material may be applied to affix the image sensor to the substrate and/or the circuit board after the electrical connections between the image sensor and the circuit board are coupled together (e.g., bonding with adhesive after the electrical connections are made). In some embodiments, the base plate may also be affixed to the substrate with adhesive material. The upper and lower bonding materials may also help prevent dust and/or other contaminants from reaching the inside of the camera module (i.e., bonding the embedded components shields the optical elements and protects the image sensor). The camera module with embedded components may thereby have a low part count and thus a simplified assembly process. Additionally, the camera module with embedded components may occupy a small amount of space in the Z-direction (i.e., have a reduced profile along the Z-axis and/or along the optical axis).

In one embodiment, the upper opening and/or the lower opening of the substrate may be formed during an injection molding process (e.g., via plastic injection molding or polymer molding). For example, one or more embedded components, such as the circuit board with its embedded surface mount electrical components, may be placed inside a mold for the substrate, and a polymer or plastic material may be injected into the mold around the circuit board and the embedded electrical components, thereby embedding the circuit board and the embedded components inside the substrate. In some embodiments, a portion of the circuit board with external electrical connections may extend outside the substrate, thereby enabling the circuit board and the image sensor to be coupled to the processor(s) of the multifunction device. In other embodiments, the upper opening, the lower opening of the substrate, and/or the opening in the central area of the circuit board may be formed after the circuit board is embedded in the substrate (e.g., via drilling, grinding, etching, or another physical material removal process).

In various embodiments, mounting the lower portion of the lens barrel holder in the upper opening of the substrate may include an active alignment process. In an embodiment, the active alignment process may include placing the camera module in a test fixture. The test fixture may include a robotic arm or other automated mechanism capable of holding the lens barrel holder within the upper opening of the substrate and making fine, precise adjustments to the position of the lens barrel holder during the active alignment process. The active alignment process may include activating the image sensor and receiving one or more signals corresponding to a test image pattern from the image sensor (e.g., capturing a test image). The alignment process may include determining, based on the captured test image, a position of the lens barrel holder corresponding to a best focus of the test image. For example, a test fixture may utilize a feedback process to iteratively make fine adjustments to the position of the lens barrel holder in the upper opening of the substrate and to measure various attributes of the received test image, such as distortion and/or focus of various areas of the test image pattern, thereby determining an optimal alignment of the lens barrel holder within the upper opening of the substrate. Once the lens barrel holder is aligned in the substrate, the active alignment process may include performing an initial cure of a bonding material that bonds one or more extensions of an upper portion of the lens barrel holder (e.g., a circular flange or multiple tabs) to a surface of the substrate. In various embodiments, the bonding material may be an adhesive, epoxy, and/or glue. In an embodiment, the initial cure may include an ultraviolet (UV) curing process. After the active alignment process, the camera module may be removed from the test fixture and a secondary curing may be performed (e.g., a heat-based curing in an oven) to firmly affix the lens barrel holder to the substrate.

In some embodiments, a camera module may include a lens barrel configured to hold (i.e., support or be attached to) a lens and other optical elements, such as a lens stack. The lens barrel may include an optically transparent center, such as a transparent material, a cavity, or an opening, in the middle of the lens barrel that allows light to pass from the lens through the lens barrel to an image sensor located on the circuit board embedded in the substrate below the lens barrel holder. In an embodiment, the lens barrel may be configured to fit inside a lens barrel holder, which may be one of the externally facing components of the camera module. The lens barrel holder thus supports the lens barrel such that the optical elements are positioned above the image sensor. In various embodiments, lens barrel holder and the corresponding upper opening in the substrate may be various shapes. For example, the lens barrel holder and the upper opening may be circular, square, rectangular, hexagonal, octagonal, oval-shaped, polygons, or other types of shapes. Similarly, the lower opening in the substrate configured to receive the image sensor may be various shapes in different embodiments, including, but not limited to, circular, square, rectangular, hexagonal, octagonal, oval-shaped, polygons, or other types of shapes.

Figure 8:
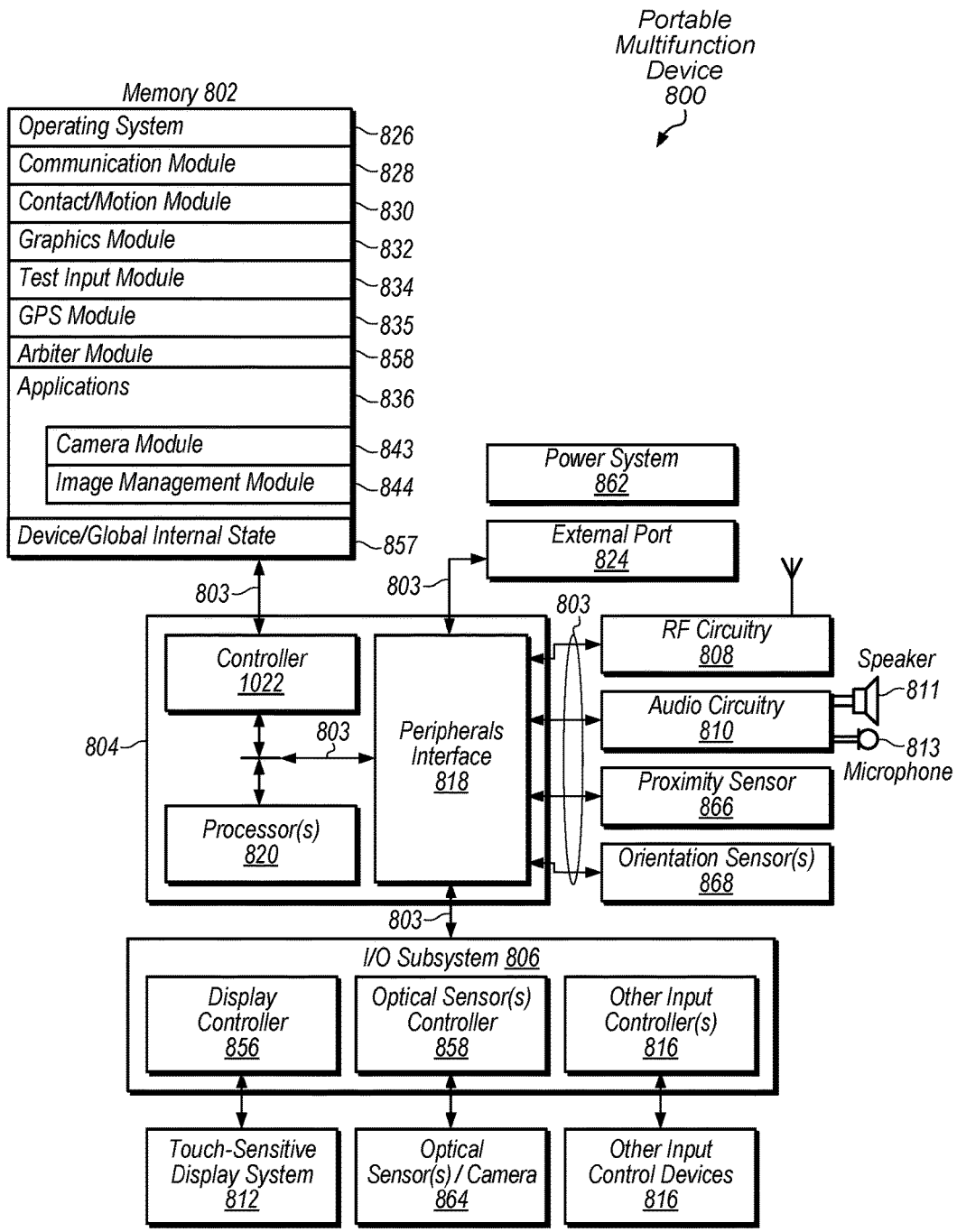
FIG. 8 is a logical block diagram illustrating an example portable multifunction device with a camera module, according to some embodiments.
Figure 9:
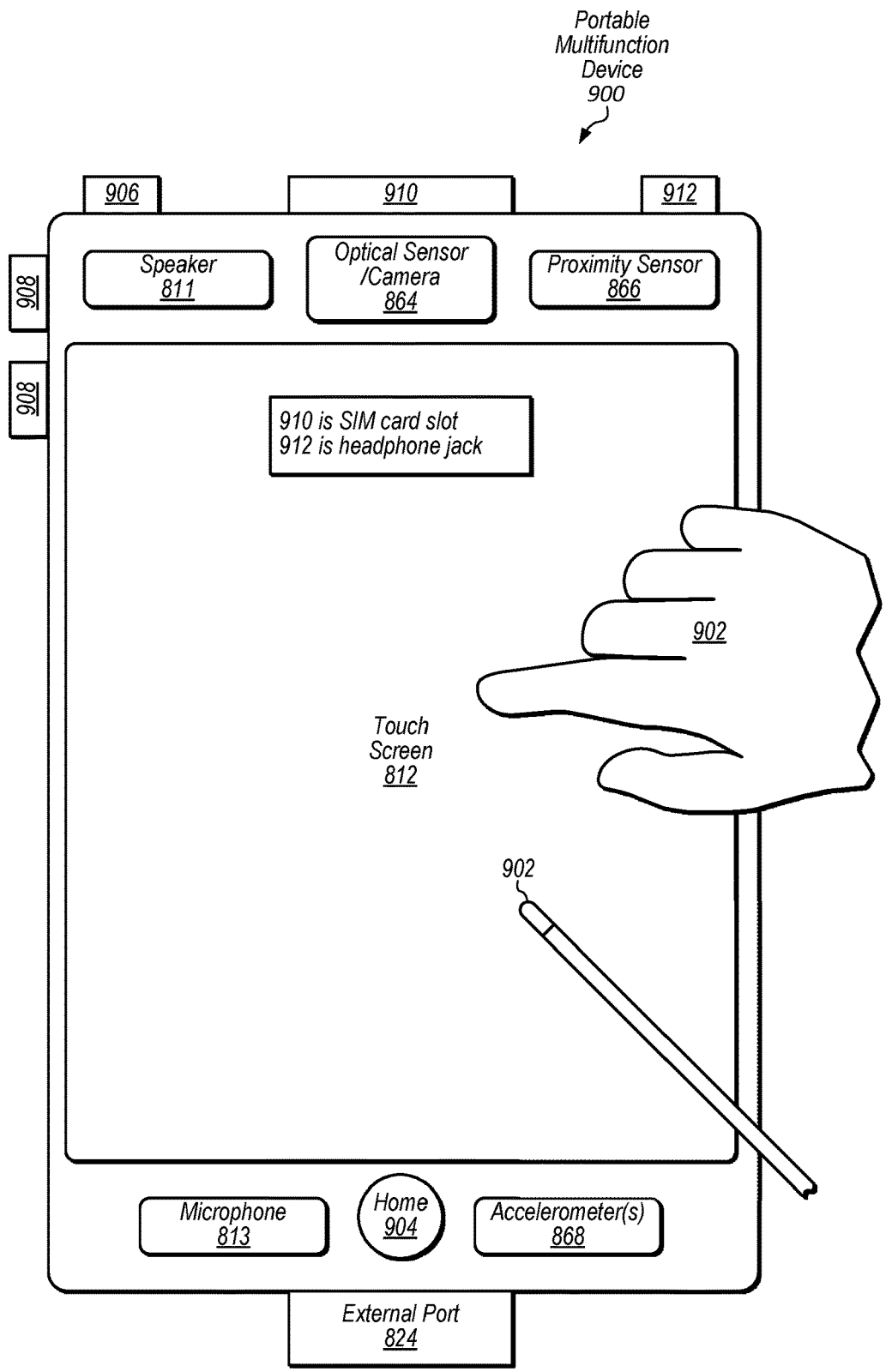
FIG. 9 is a logical block diagram illustrating an example portable multifunction device having a camera module, according to some embodiments.
Figure 10:
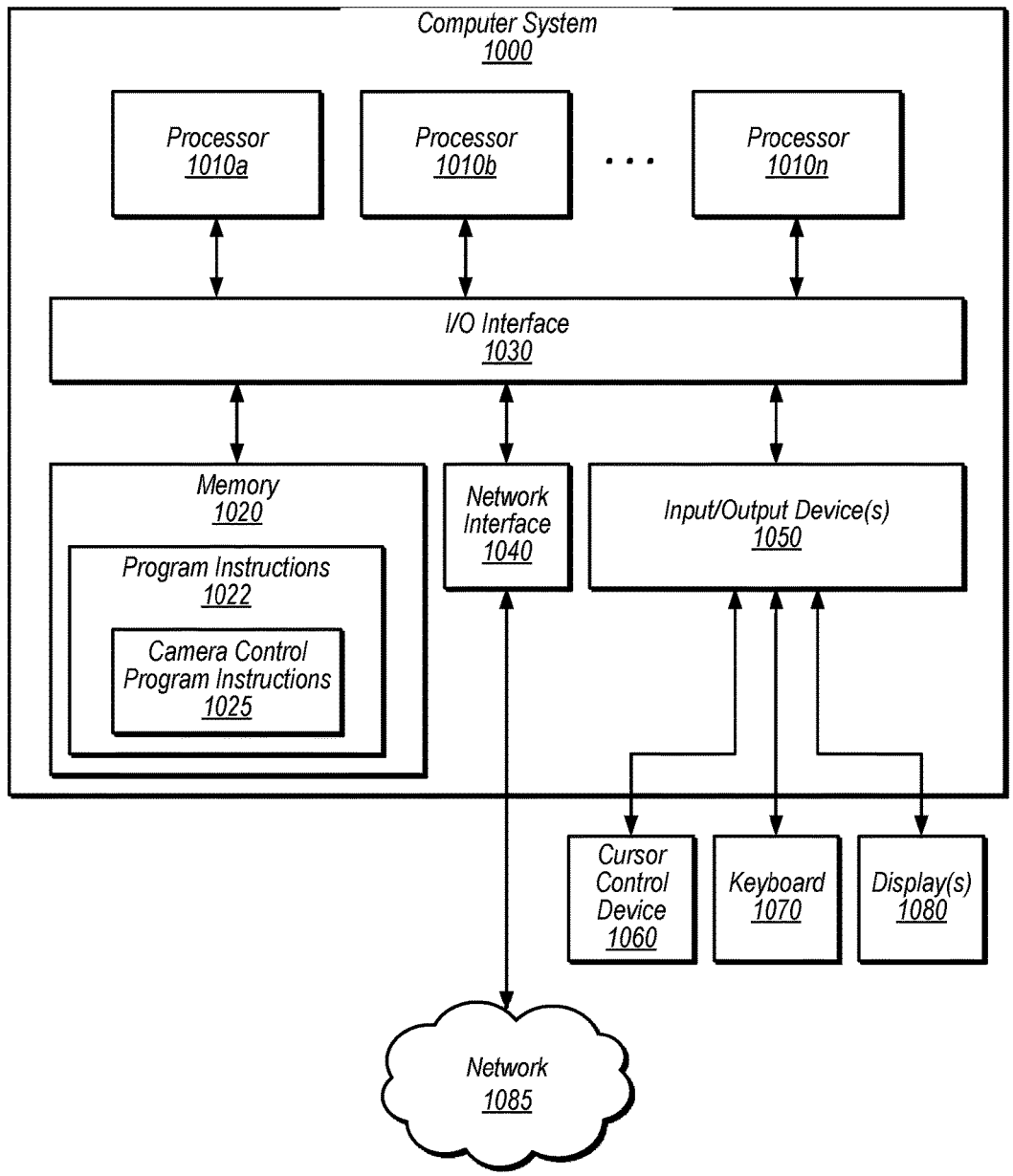
FIG. 10 is a logical block diagram illustrating an example computer system, according to some embodiments.

In an embodiment, the substrate may have one or more holes or cavities in its center configured to provide space for the image sensor to be attached to the bottom of the substrate via a flip chip mount and/or for the lens barrel holder to fit at least partially inside an upper portion of the substrate. In an embodiment, the substrate may be attached to a flexible circuit board, which may include multiple electrical connections configured to conduct electrical signals (e.g., control signals, data signals, and electrical power) between the substrate and processors and/or other components of a multifunction device that includes the camera module. Examples of multifunction devices are illustrated in FIGS. 8, 9, and 10, which are discussed below. In some embodiments, a stiffener (e.g., a metal, ceramic, or plastic component) may be attached to the bottom of the flexible circuit board, thereby forming a rigid protective base for the camera module. In an embodiment, the stiffener may also include one or more electrical ground connections. Examples of the various components of a camera module are illustrated in FIGS. 1-7, which are discussed in detail below.

The techniques described herein for implementing a camera module with integrated components may be further illustrated in terms of an example system that employs them, as well as in terms of example method of manufacturing them. As noted herein, these techniques may be implemented in any type of camera, apparatus, or computing system that includes the capability to capture and process image data, including video clips.

In an embodiment, a stream of raw pixel data collected from an image sensor may be received at an image signal processor (ISP). Raw pixel data may be captured and processed in stream fashion as it is collected at an image sensor. In one embodiment, raw image pixel data, as discussed above, may be formatted such that multiple color components or channels are not included for an individual pixel. An example of raw image data is a Bayer image format (of which there may be many variations) that includes different rows of pixel values for collecting light in different colors, green, red, and blue, which depend on the configuration of the image sensor. These pixel values (e.g., green values, red values, or blue values) may be collected and provided in raster order to the image signal processor, in some embodiments. In various embodiments, one or more image sensor(s) may be included in a camera module, and the image sensor(s) may be complementary metal-oxide-semiconductor (CMOS) image sensor(s), charge coupled device (CCD) image sensor(s), photodiode(s), and/or another types of image sensor(s). In some embodiments, the lens barrel holder may include a lens barrel that includes one or more optical elements, such as a color filter (e.g., a Bayer color filter) and one or more lenses. In one embodiment, the color filter may be an optical element inside the bottom of the lens barrel and/or lens barrel holder. In another embodiment, the color filter may be a material coating on the bottom surface of the lens barrel and/or the lens barrel holder.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

FIG. 1 is a logical block diagram illustrating an example camera module 100, according to some embodiments. As illustrated in this example, camera module 100 may include a substrate 105, an image sensor 115, and a lens barrel holder 150. In an embodiment, substrate 105 may include multiple embedded surface mount electrical components 110A-N, which are mounted to a top of a circuit board layer 130 of substrate 105 and not exposed outside substrate 105. In some embodiments, the embedded surface mount electrical components 110A-N may be mounted in groups in proximity to the corners of the circuit board layer 130 inside substrate 105, such that the embedded surface mount electrical components 110A-N are located away from a central optical opening in the circuit board layer 130. In one embodiment, circuit board layer 130 may be embedded within substrate 105. As shown, a portion of circuit board layer 130 may extend outside substrate 105, thereby enabling one or more external electrical connections on the extended portion of circuit board layer 130 to couple to one or more components of a multifunction device.

In an embodiment, image sensor 115 may include one or more image sensor electrical connections 120A-N (e.g., solder balls, bond pads, or the like) on a top surface of image sensor 115. Similarly, circuit board layer 130 embedded in substrate 105 may include one or more circuit board electrical connections 135A-N on a lower surface of circuit board layer 130. As depicted, the one or more circuit board electrical connections 135A-N may also be located within a lower opening of substrate 105. The lower opening of substrate 105 may be shaped to receive image sensor 115. Image sensor 115 may thereby be flip chip mounted to circuit board layer 130 within the lower opening of substrate 105 and coupled to circuit board layer 130 via the respective image sensor electrical connections 120A-N and circuit board electrical connections 135A-N. In some embodiments, an adhesive material (e.g., epoxy or glue) may be applied to image sensor 115 (e.g., adhesive on the upper surface of image sensor 115 around the outer edges), such that image sensor 115 may be bonded to circuit board layer 130 and/or substrate 105 once the electrical connections are made.

In one embodiment, lens barrel holder 150 may include an optical aperture 155 and a central area configured to allow light to pass through a lens barrel inside the lens barrel holder. In an embodiment, the lens barrel holder 150 may include one or more optical element(s) 160 and an optical filter 175. The optical element(s) 160 may include one or more lenses and/or a lens stack. Optical filter 175 may be a Bayer color filter or another type of color filter. In various embodiments, lens barrel holder 150 may include one or more extension(s) 165 that extend laterally around an outer edge of lens barrel holder 150, and a lower portion of lens barrel holder 150 may be configured to fit, at least partially, inside an upper opening in substrate 105. Light may pass through aperture 155, optical element(s) 160, optical filter 175, and the opening in circuit board layer 130, thereby reaching one or more optical image sensor(s) of image sensor 115. In various embodiments, image sensor 115 may include complementary metal-oxide-semiconductor (CMOS) image sensor(s), charge coupled device (CCD) image sensor(s), photodiode(s), and/or another types of image sensor(s).

In an embodiment, a stiffener 140, such as a metal grounding plate and/or a firm protective element may be affixed to a bottom of camera module 100 below image sensor 115, thereby protecting image sensor 115 and providing rigidity and/or stability to camera module 100.

Please note that FIG. 1 is provided as merely an example of a camera module. Different combinations of the illustrated components (as well as components not illustrated) may be used to implement a camera module. For example, in some embodiments various image sensor shapes, lens barrel holder shapes, and/or various shapes of respective lower and upper openings in the substrate may be implemented. In various embodiments, the shape of the image sensor and lower opening, and/or lens barrel holder and upper opening may be circular, square, rectangular, oval, polygons, parallelograms, or other shapes suitable for implementing a camera module. Thus, the components of FIG. 1 and their respective layout or ordering is not intended to be limiting to the various other combinations which may be used by a camera module.

Figure 2:
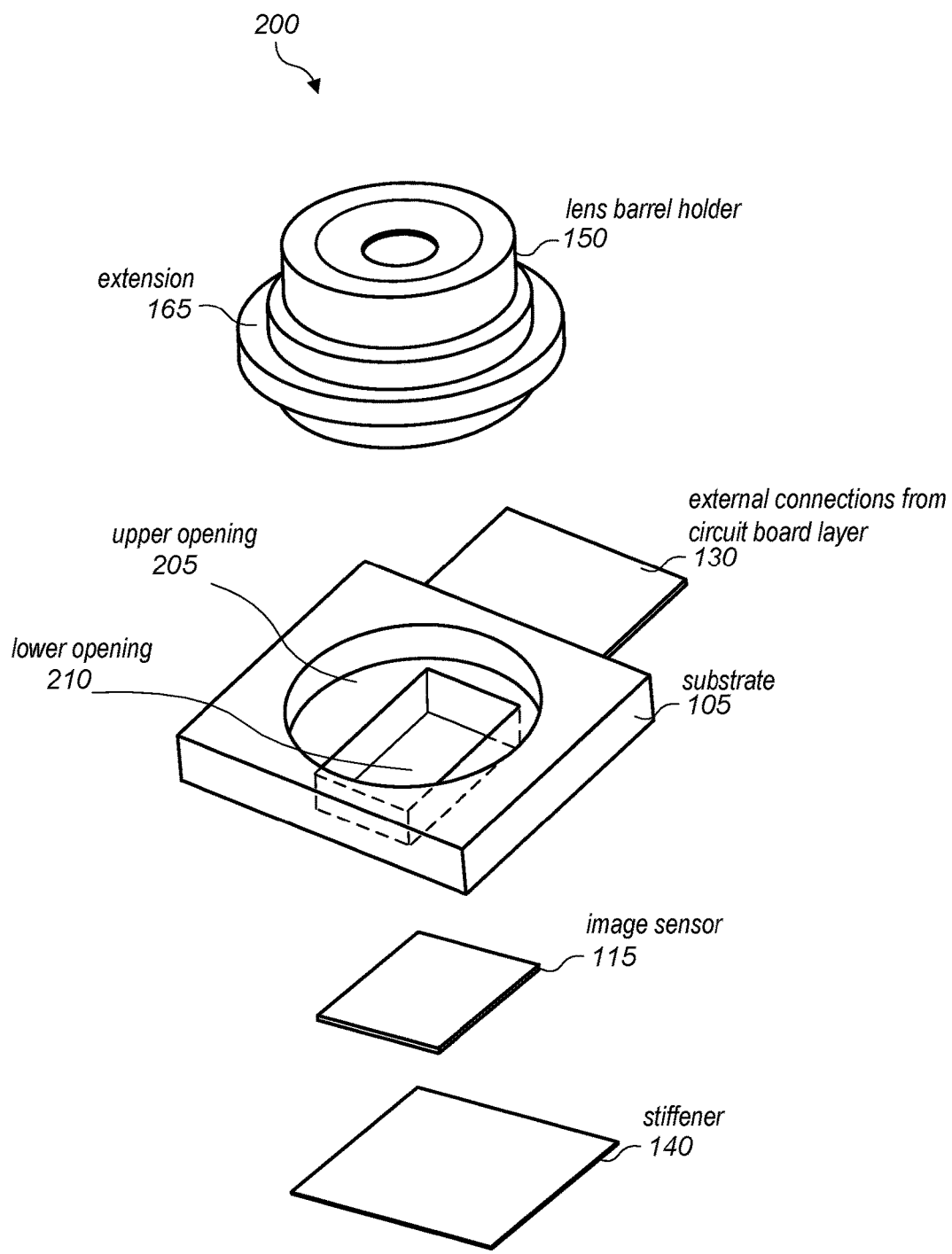
FIG. 2 is a logical block diagram illustrating an example camera module, according to some embodiments.

FIG. 2 is a logical block diagram illustrating an example "exploded view" of various components illustrating an example camera module 200, according to some embodiments. In one embodiment, camera module 200 may be configured similarly to camera module 100 of FIG. 1. In an embodiment, camera module 200 may include lens barrel holder 150, which has a circular or cylindrical lower portion and an extension 165 (e.g., a flange) around an outer edge of an upper portion of lens barrel holder 150, where the upper portion of the lens barrel holder is above the lower portion of the lens barrel holder. For example, the lower portion of the lens barrel holder may be configured to fit inside an upper opening of the substrate, and an upper portion of the lens barrel holder that extends upward (e.g., vertically) relative to the substrate may also include one or more extensions that extend laterally outward on top of the substrate (i.e., horizontally along a top surface of the substrate) from the wall of the lens barrel holder.

In one embodiment, camera module 200 also includes substrate 105, which includes a round upper opening 205 configured to enable the cylindrical lower portion of lens barrel holder 150 to fit at least partially inside upper opening 205 of substrate 105. In an embodiment, camera module 200 may also include a rectangular lower opening 210 configured to receive image sensor 115. As described above, image sensor 115 may include electrical connections that couple image sensor 115 to circuit board layer 130. In an embodiment, circuit board layer 130 may include one or more external connections on a portion of circuit board layer 130 that extends outside substrate 105. In some embodiments, camera module 200 may include a stiffener 140 configured to be mounted to a base of camera module 200.

Figure 3:
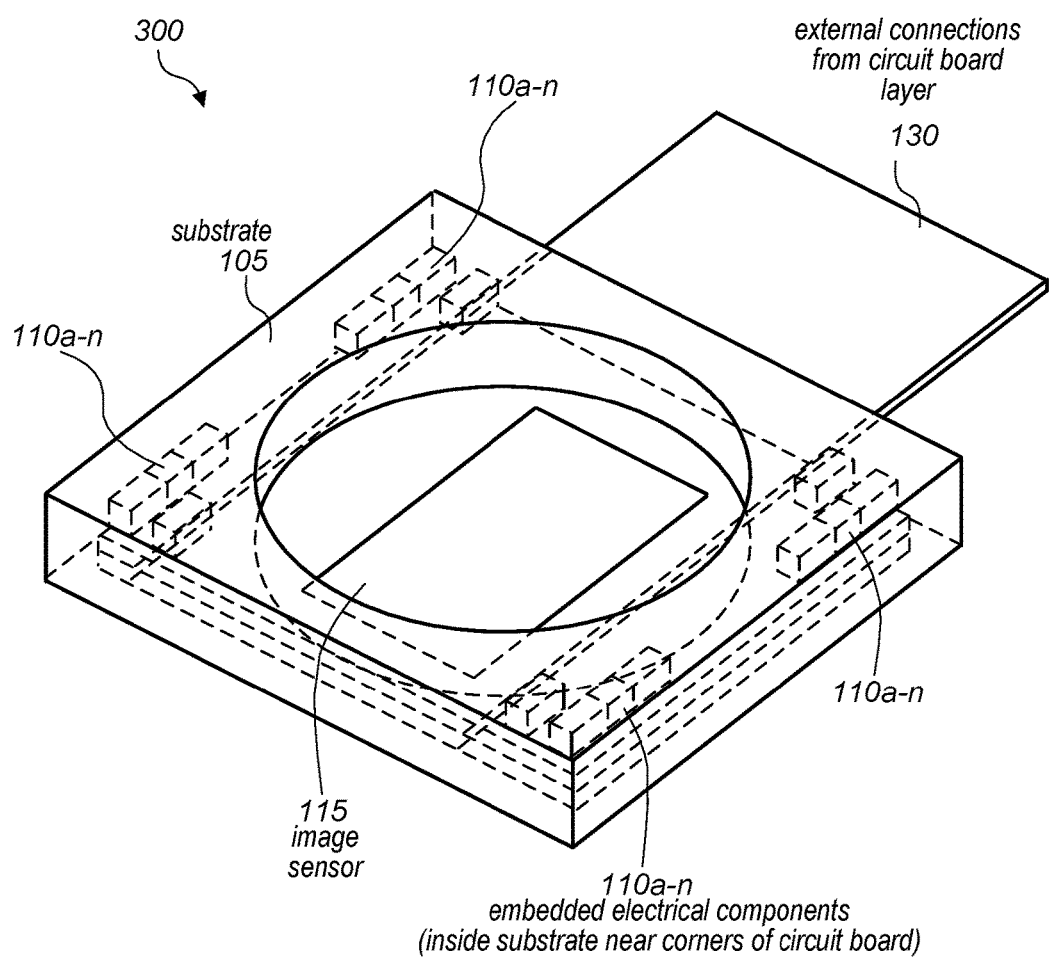
FIG. 3 is a logical block diagram illustrating an example camera module, according to some embodiments.

FIG. 3 is a logical block diagram illustrating an example camera module 300, according to some embodiments. As depicted, camera module 300 may include substrate 105, which includes multiple embedded electrical components 110A-N inside substrate 105 and not exposed to an outside of substrate 105. Since embedded electrical components 110A-N are not exposed to an outside, embedded electrical components 110A-N are thus protected within substrate 105. Embedded electrical components 110A-N are coupled to circuit board layer 130 and grouped in respective corners of circuit board layer 130 within substrate 105, such that embedded electrical components 110A-N are located away from a central opening in circuit board layer 130 and the upper opening in substrate 105. As depicted, image sensor 115 may be flip chip mounted to circuit board layer 130 and the light sensitive elements of image sensor 115 may thus be in the optical path of the upper opening in substrate 105 and the opening in circuit board layer 130.

Figure 4:
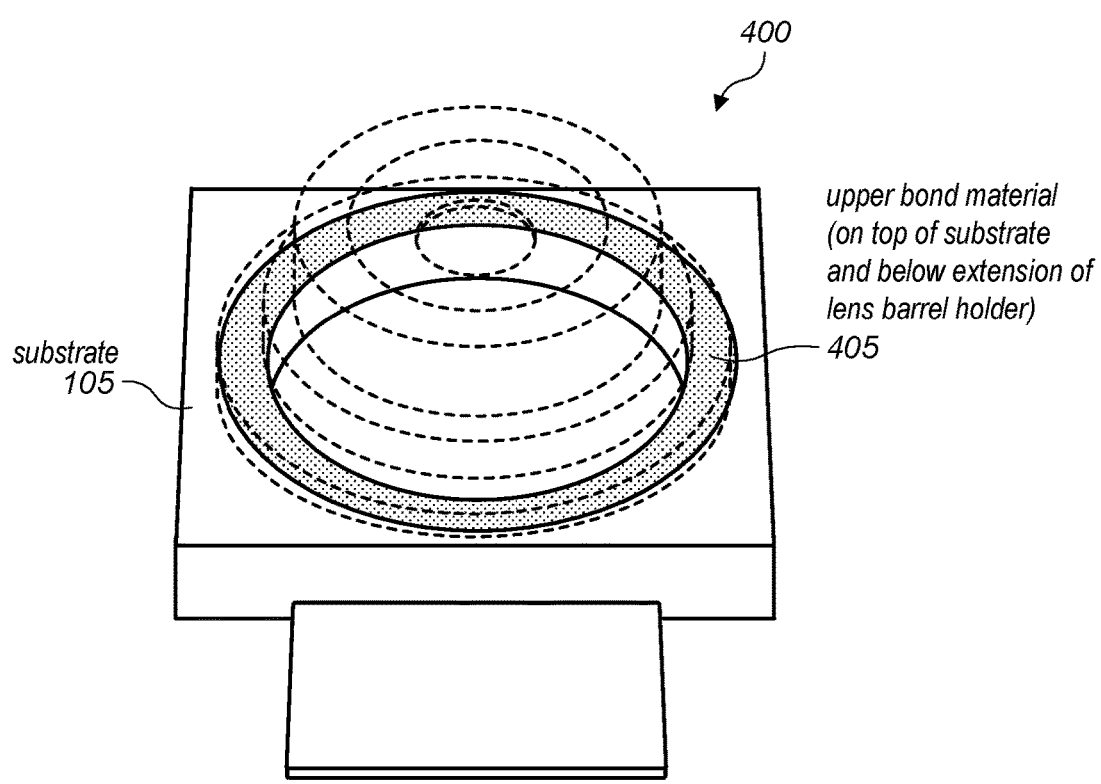
FIG. 4 is a logical block diagram illustrating a cross-sectional view of an example camera module, according to some embodiments.

FIG. 4 is a logical block diagram illustrating a cross-sectional view of an example camera module 400, according to some embodiments. In an embodiment, camera module 400 may be configured similarly to camera modules 100, 200, and 300 of FIGS. 1-3, respectively.

FIG. 4 is a horizontal cross section of an upper portion of camera module 400 viewed from a perspective where the lens barrel holder has been removed for illustrative purposes. In an embodiment, camera module 400 may include substrate 105 with embedded components. In one embodiment, camera module 400 may include an upper bond material 405 on a top surface of substrate 105 and below an extension of the lens barrel holder. Upper bond material 405 (e.g., adhesive, epoxy, or glue) may thus affix the lens barrel holder to substrate 105 while a lower portion of the lens barrel holder fits at least partially inside substrate 105.

Figure 5:
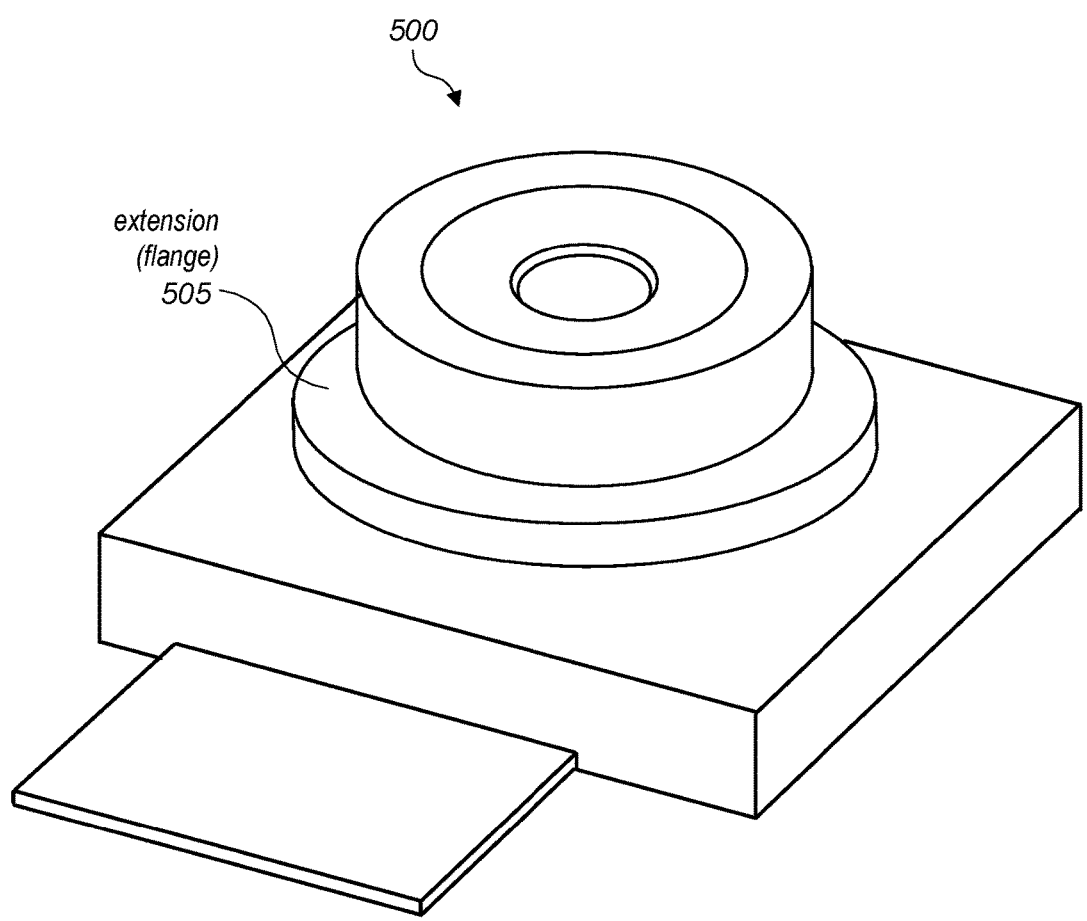
FIG. 5 is a logical block diagram illustrating an example camera module, according to some embodiments.

FIG. 5 is a logical block diagram illustrating an example camera module 500, according to some embodiments. In an embodiment, camera module 500 may be configured similarly to the camera modules of FIGS. 1-4 and may thus include an embedded circuit board layer with embedded electrical components and an image sensor. In one embodiment, the lens barrel holder of camera module 500 may include a flange extension 505 that extends laterally around an outer circumference of the lens barrel holder. The flange extension 505 thus sits on top of the substrate and enables the lens barrel holder to be affixed to the substrate via a bonding material.

Figure 6:
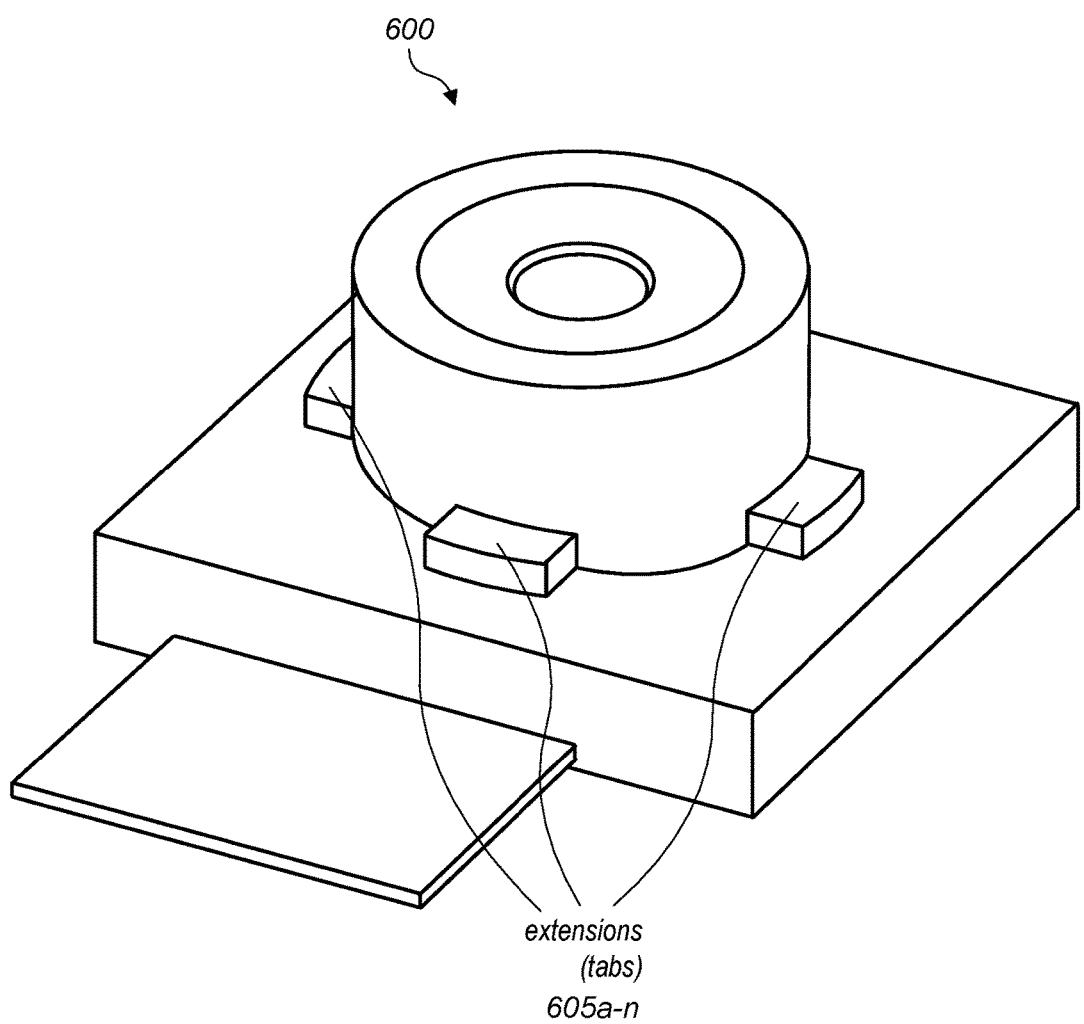
FIG. 6 is a logical block diagram illustrating an example camera module, according to some embodiments.

FIG. 6 is a logical block diagram illustrating an example camera module 600, according to some embodiments. In an embodiment, camera module 600 may be configured similarly to the camera modules of FIGS. 1-4 and may thus include an embedded circuit board layer with embedded electrical components and an image sensor. In one embodiment, the lens barrel holder of camera module 600 may include multiple tabs as extensions 605A-N that extends laterally from respective outer sides of the lens barrel holder. The tabs extensions 605A-N thus sit on top of the substrate and enable the lens barrel holder to be affixed to the substrate via a bonding material.

Although FIG. 6 depicts a set of four rectangular tabs as extensions 605A-N configured to affix the lens barrel holder to the substrate, in other embodiments different numbers and/or shapes of tabs may be included as extensions of the lens barrel holder.

FIGS. 1-6 provide examples of a camera module, which may implement a substrate with an embedded circuit board and embedded electrical components, an image sensor mounted to the circuit board, and a lens barrel holder configured to fit at least partially within an upper opening of a substrate. However, numerous other types or configurations of systems or devices may implement a camera module with embedded components, such as camera modules having various shapes of lens barrel holders, upper openings, lower openings, and image sensors. Similarly, camera modules may implement various types of adhesives, epoxies, and/or glues to bond various components of the camera module physically together. In some embodiments, different manufacturing processes may be used to form, deposit, install, or otherwise add the embedded components to the camera module, including, but not be limited to injection molding processes, physical material removal processes, active alignment processes, adhesive curing processes, or the like.

Figure 7:
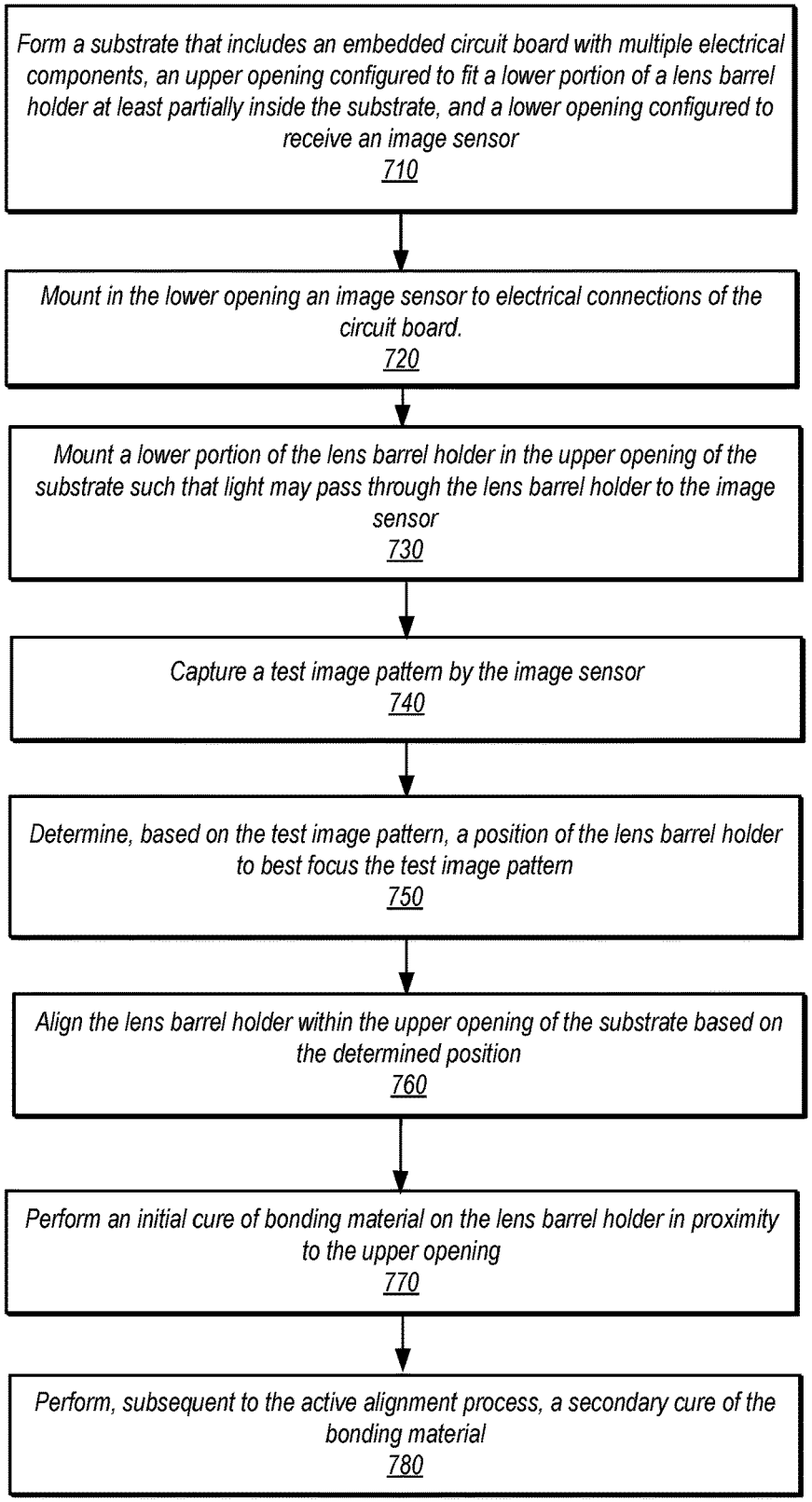
FIG. 7 is a high-level flowchart illustrating various methods and techniques for manufacturing a camera module, according to some embodiments.

FIG. 7 is a high-level flowchart illustrating various methods and techniques for manufacturing a camera module with embedded components, according to some embodiments. The various components described above may implement these techniques (in addition to those described with regard to FIGS. 8-10 below), as well as various other methods of manufacture.

As indicated at 710, a method of manufacturing a camera module may include forming a substrate that includes an embedded circuit board with multiple electrical components, an upper opening configured to fit a lower portion of a lens barrel holder at least partially inside the substrate, and a lower opening configured to receive an image sensor.

As indicated at 720, the method may include mounting the image sensor in the lower opening of the substrate and to the electrical connections of the circuit board.

As indicated at 730, the method may include mounting a lower portion of the lens barrel holder in the upper opening of the substrate, such that light may pass through the lens barrel holder and the upper opening of the substrate to the image sensor mounted on a circuit board layer embedded within the substrate.

As indicated at 740, the method may include an active alignment process. The active alignment process may include placing the camera module in a test fixture, activating the image sensor (i.e., sending one or more electrical signals to/from the image sensor) and capturing a test image pattern with the image sensor. For example, a test image pattern may be placed in a field of view of the camera module and the image sensor may capture the image and transmit one or more signals (e.g., image data) to the test fixture and/or to a multifunction device coupled to the camera module.

As indicated at 750, the method may include determining, by the test fixture and/or the multifunction device and based at least in part on the received test image pattern, a position of the lens barrel holder to best focus the test image pattern. For example, the test fixture may include a robotic arm or other mechanical component that makes fine adjustments to the position of the lens barrel holder within the upper opening of the substrate, and the test fixture and/or multifunction device may measure and evaluate one or more quality metrics of the received test image pattern (e.g., distortion and/or level of focus of various areas of the test image pattern) based on the movements of the lens barrel holder. In some embodiments, the active alignment process may be iterative and/or include a feedback loop, such that multiple rounds of capturing a view of the test image, evaluating the captured image, and adjusting the position of the lens barrel holder may be performed until an optimal or best image focus is determined.

As indicated at 760, the method may include aligning the lens barrel holder within the upper opening of the substrate based on the determined position.

As indicated at 770, the method may include performing an initial cure of bonding material on the lens barrel holder in proximity to the upper opening of the substrate (e.g., curing adhesive between the extension(s) of the lens barrel holder and the top surface of the substrate). In one embodiment, the initial cure may include an ultraviolet (UV) curing process. After the initial cure, the method may include removing the camera module from the test fixture.

As indicated at 780, the method may include performing, subsequent to the active alignment process (i.e., after the lens barrel holder has been successfully aligned), a secondary cure of the bonding material in proximity to the upper opening. In an embodiment, the secondary cure may include a heat-based curing process, such as cooking the camera module in an oven.

In some embodiments, the method may include curing the bonding material of both the upper and lower openings. In one embodiment, the bonding material in proximity to the image sensor and the lower opening may be cured prior to the active alignment process. In other words, the image sensor may be coupled to the circuit board and affixed to the substrate before the lens barrel holder is aligned and affixed to the substrate.

Attention is now directed toward embodiments of portable devices with cameras. One example of a system that is configured to implement any or all of the techniques described herein is illustrated in FIG. 8. For example, portable multifunction device 800 may include camera 864 in accordance with some embodiments. Camera 864 is sometimes called an "optical sensor" for convenience, and may also be known as or called an optical sensor system. Device 800 may include memory 802 (which may include one or more computer readable storage mediums), memory controller 822, one or more processing units (CPU's) 820, peripherals interface 818, RF circuitry 808, audio circuitry 810, speaker 811, touch-sensitive display system 812, microphone 813, input/output (I/O) subsystem 806, other input or control devices 816, and external port 824. Device 800 may include one or more optical sensors 864. These components may communicate over one or more communication buses or signal lines 803.

It should be appreciated that device 800 is only one example of a portable multifunction device, and that device 800 may have more or fewer components than shown, may combine two or more components, or may have a different configuration or arrangement of the components. The various components shown in FIG. 8 may be implemented in hardware, software, or a combination of hardware and software, including one or more signal processing and/or application specific integrated circuits.

Memory 802 may include high-speed random access memory and may also include non-volatile memory, such as one or more magnetic disk storage devices, flash memory devices, or other non-volatile solid-state memory devices. Access to memory 802 by other components of device 800, such as CPU 820 and the peripherals interface 818, may be controlled by memory controller 822.

Peripherals interface 818 can be used to couple input and output peripherals of the device to CPU 820 and memory 802. The one or more processors 820 run or execute various software programs and/or sets of instructions stored in memory 802 to perform various functions for device 800 and to process data.

In some embodiments, peripherals interface 818, CPU 820, and memory controller 822 may be implemented on a single chip, such as chip 804. In some other embodiments, they may be implemented on separate chips.

RF (radio frequency) circuitry 808 receives and sends RF signals, also called electromagnetic signals. RF circuitry 808 converts electrical signals to/from electromagnetic signals and communicates with communications networks and other communications devices via the electromagnetic signals. RF circuitry 808 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 808 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 810, speaker 811, and microphone 813 provide an audio interface between a user and device 800. Audio circuitry 810 receives audio data from peripherals interface 818, converts the audio data to an electrical signal, and transmits the electrical signal to speaker 811. Speaker 811 converts the electrical signal to human-audible sound waves. Audio circuitry 810 also receives electrical signals converted by microphone 813 from sound waves. Audio circuitry 810 converts the electrical signal to audio data and transmits the audio data to peripherals interface 818 for processing. Audio data may be retrieved from and/or transmitted to memory 802 and/or RF circuitry 808 by peripherals interface 818.

I/O subsystem 806 couples input/output peripherals on device 800, such as touch screen 812 and other input control devices 816, to peripherals interface 818. I/O subsystem 806 may include display controller 856 and one or more input controllers 860 for other input or control devices. The one or more input controllers 860 receive/send electrical signals from/to other input or control devices 816. The other input control devices 816 may include physical buttons (e.g., push buttons, rocker buttons, etc.), dials, slider switches, joysticks, click wheels, and so forth. In some alternate embodiments, input controller(s) 860 may be coupled to any (or none) of the following: a keyboard, infrared port, USB port, and a pointer device such as a mouse. The one or more buttons (e.g., 908 of FIG. 9) may include an up/down button for volume control of speaker 811 and/or microphone 813. The one or more buttons may include a push button (e.g., 906 of FIG. 9).

Touch-sensitive display 812 provides an input interface and an output interface between the device and a user. Display controller 856 receives and/or sends electrical signals from/to touch screen 812. Touch screen 812 displays visual output to the user. The visual output may include graphics, text, icons, video, and any combination thereof (collectively termed "graphics"). In some embodiments, some or all of the visual output may correspond to user-interface objects.

Touch screen 812 may have a touch-sensitive surface, sensor or set of sensors that accepts input from the user based on haptic and/or tactile contact. Touch screen 812 and display controller 856 (along with any associated modules and/or sets of instructions in memory 802) detect contact (and any movement or breaking of the contact) on touch screen 812 and converts the detected contact into interaction with user-interface objects (e.g., one or more soft keys, icons, web pages or images) that are displayed on touch screen 812. In an exemplary embodiment, a point of contact between touch screen 812 and the user corresponds to a finger of the user.

Touch screen 812 may use LCD (liquid crystal display) technology, LPD (light emitting polymer display) technology, or LED (light emitting diode) technology, although other display technologies may be used in other embodiments. Touch screen 812 and display controller 856 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 812. In an exemplary embodiment, projected mutual capacitance sensing technology is used, such as that found in the iPhone®, iPod Touch®, and iPad® from Apple Inc. of Cupertino, Calif.

Device 800 also includes power system 862 for powering the various components. Power system 862 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 800 may also include one or more optical sensors or cameras 864. FIG. 8 shows an optical sensor coupled to optical sensor controller 858 in I/O subsystem 806. Optical sensor 864 may include charge-coupled device (CCD), complementary metal-oxide semiconductor (CMOS) phototransistors, and/or photodiodes. Optical sensor 864 receives light from the environment, projected through one or more lens, and converts the light to data representing an image. In conjunction with imaging module 843 (also called a camera module), optical sensor 864 may capture still images or video. In some embodiments, an optical sensor is located on the back of device 800, opposite touch screen display 812 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display. The camera modules of FIGS. 1-7 may thus be located, positioned, or installed on the front of device 800 and/or on the back of device 800 in various embodiments.

Device 800 may also include one or more proximity sensors 866. FIG. 8 shows proximity sensor 866 coupled to peripherals interface 818. Alternately, proximity sensor 866 may be coupled to input controller 860 in I/O subsystem 806. In some embodiments, the proximity sensor turns off and disables touch screen 812 when the multifunction device is placed near the user's ear (e.g., when the user is making a phone call).

Device 800 may include one or more orientation sensors 868. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 800. In some embodiments, the one or more orientation sensors include any combination of orientation/rotation sensors. FIG. 8 shows the one or more orientation sensors 868 coupled to peripherals interface 818. Alternately, the one or more orientation sensors 868 may be coupled to an input controller 860 in I/O subsystem 806. In some embodiments, information is displayed on the touch screen display in a portrait view or a landscape view based on an analysis of data received from the one or more orientation sensors.

In some embodiments, the software components stored in memory 802 include operating system 826, communication module (or set of instructions) 828, contact/motion module (or set of instructions) 830, graphics module (or set of instructions) 832, text input module (or set of instructions) 834, Global Positioning System (GPS) module (or set of instructions) 835, device/global internal state 857, and applications (or sets of instructions) 836. Device/global internal state 857 may include one or more of: active application state, indicating which applications, if any, are currently active; display state, indicating what applications, views or other information occupy various regions of touch screen display 812; sensor state, including information obtained from the device's various sensors and input control devices 816; and location information concerning the device's location and/or attitude.

Operating system 826 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 828 facilitates communication with other devices over one or more external ports 824 and also includes various software components for handling data received by RF circuitry 808 and/or external port 824. External port 824 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 830 may detect contact with touch screen 812 (in conjunction with display controller 856) and other touch sensitive devices (e.g., a touchpad or physical click wheel). Contact/motion module 830 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 830 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 830 and display controller 856 detect contact on a touchpad.

Graphics module 832 includes various known software components for rendering and displaying graphics on touch screen 812 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like. Text input module 834, which may be a component of graphics module 832, provides soft keyboards for entering text in various applications that need text input.

GPS module 835 determines the location of the device and provides this information for use in various applications (e.g., to camera 843 as picture/video metadata, and to applications that provide location-based services).

Examples of other applications 836 that may be stored in memory 802 include other word processing applications, other image editing applications, drawing applications, presentation applications, JAVA-enabled applications, encryption, digital rights management, voice recognition, and voice replication.

In conjunction with touch screen 812, display controller 856, optical sensor(s) 864, optical sensor controller 858, contact module 830, graphics module 832, and image management module 844, camera module 843 includes executable instructions to capture still images or video (including a video stream) and store them into memory 802, modify characteristics of a still image or video, or delete a still image or video from memory 802.

In conjunction with touch screen 812, display controller 856, contact module 830, graphics module 832, text input module 834, and camera module 843, image management module 844 includes executable instructions to arrange, modify (e.g., edit), or otherwise manipulate, label, delete, present (e.g., in a digital slide show or album), and store still and/or video images.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 802 may store a subset of the modules and data structures identified above. Furthermore, memory 802 may store additional modules and data structures not described above.

In some embodiments, device 800 is a device where operation of a predefined set of functions on the device is performed exclusively through a touch screen and/or a touchpad. By using a touch screen and/or a touchpad as the primary input control device for operation of device 800, the number of physical input control devices (such as push buttons, dials, and the like) on device 800 may be reduced.

The predefined set of functions that may be performed exclusively through a touch screen and/or a touchpad include navigation between user interfaces. In some embodiments, the touchpad, when touched by the user, navigates device 800 to a main, home, or root menu from any user interface that may be displayed on device 800. In such embodiments, the touchpad may be referred to as a "menu button." In some other embodiments, the menu button may be a physical push button or other physical input control device instead of a touchpad.

In different embodiments, device 800 may be any of various types of devices, including, but not limited to, a personal computer system; a desktop computer; a laptop computer; a notebook, tablet, slate, or netbook computer; a mainframe computer system; a handheld computer; a workstation; a network computer; a camera; a set top box; a mobile device, such as a mobile phone, pager, personal data assistant (PDA), tablet device, or music player; an I/O device such as a digital camera, a scanner, a video recorder; a consumer device; a video game console; a handheld video game device; or in general any type of computing or electronic device that includes the functionality of a camera or video camera. Example embodiments of device 800 are illustrated in FIGS. 9 and 10, which are discussed below.

FIG. 9 is a logical block diagram illustrating an example portable multifunction device, according to some embodiments. FIG. 9 illustrates a portable multifunction device 800 having a touch screen 812 in accordance with some embodiments. The touch screen may display one or more graphics within user interface (UI). In this embodiment, as well as others described below, a user may select one or more of the graphics by making a gesture on the graphics, for example, with one or more fingers 902 (not drawn to scale in the figure) or one or more styluses 903 (not drawn to scale in the figure).

Device 800 may also include one or more physical buttons, such as "home" or menu button 904. As described previously, menu button 904 may be used to navigate to any application 836 in a set of applications that may be executed on device 800. Alternatively, in some embodiments, the menu button is implemented as a soft key in a GUI displayed on touch screen 812.

In one embodiment, device 800 includes touch screen 812, menu button 904, push button 906 for powering the device on/off and locking the device, volume adjustment button(s) 908, Subscriber Identity Module (SIM) card slot 910, head set jack 912, and docking/charging external port 824. Push button 906 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 800 also may accept verbal input for activation or deactivation of some functions through microphone 813.

It should be noted that, although many of the following examples will be given with reference to optical sensor/ camera 864 (on the front of a device), rear-facing camera or optical sensor that is pointed opposite from the display may be used instead of optical sensor/camera 864.

FIG. 10 is a logical block diagram illustrating computer system 1000 that is configured to execute any or all of the embodiments described above. For example, computer system 1000 may be configured similarly to portable multifunction device 800 of FIGS. 8 and 9. In different embodiments, computer system 1000 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera module as described herein, may be executed in one or more computer systems 1000, which may interact with various other devices. Note that any component, action, or functionality described above with respect to FIGS. 1-9 may be implemented on one or more computers configured as computer system 1000 of FIG. 10, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. In some embodiments, processors 1010 may be configured to send control signals to a solid state lens in a camera module, where the camera module is connected to processors 1010 by a flexible circuit board configured to communicate via I/O interface 1030. In various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of CPU(s) 1010 may commonly, but not necessarily, implement the same ISA. Processors 1010 may employ any microarchitecture, including scalar, superscalar, pipelined, superpipelined, out of order, in order, speculative, non-speculative, etc., or combinations thereof. Processors 1010 may include circuitry to implement microcoding techniques. Processors 1010 may include one or more processing cores each configured to execute instructions. Processors 1010 may include one or more levels of caches, which may employ any size and any configuration (set associative, direct mapped, etc.).

System memory 1020 may be configured to store camera control program instructions 1025 and/or camera control data accessible by processor 1010. In various embodiments, system memory 1020 may be implemented using any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 1000 in a chip-on-chip configuration, a package-on-package configuration, or a multi-chip module configuration. In some embodiments, system memory 1020 may store pixel data or other image data or statistics in various formats. Similarly, while the example system 1000 illustrated in FIG. 10 may include persistent storage for non-volatile storage of image data or other data used in the system, in other embodiments, the system may include other types of non-volatile memory (e.g. read-only memory (ROM)) for those purposes. In an embodiment, system memory 1020 may include data, such as a camera control program instructions 1025. In the illustrated embodiment, program instructions 1025 may be configured to implement a lens control application (e.g., camera control program instructions 1025) incorporating any of the functionality described above. Additionally, existing camera control data of memory 1020 may include any of the information or data structures described above. In some embodiments, program instructions and/or data may be received, sent or stored upon different types of computer-accessible media or on similar media separate from system memory 1020 or computer system 1000. While computer system 1000 is described as implementing the functionality of functional blocks of previous Figures, any of the functionality described herein may be implemented via such a computer system.

In one embodiment, I/O interface 1030 may be configured to coordinate I/O traffic between processor(s) 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1220, may be incorporated directly into processor 1010.

Network interface 1040 may be configured to allow data to be exchanged between computer system 1000 and other devices attached to a network 1085 (e.g., carrier or agent devices) or between nodes of computer system 1000. Network 1085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface

1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions (e.g., camera control program instructions 1025), which may be processor-executable to implement any element or action described above. In one embodiment, the program instructions may implement the methods described above. In other embodiments, different elements and data may be included. Note that data may include any data or information described above.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

Those skilled in the art will appreciate that system 1000 is merely illustrative and is not intended to limit the scope of embodiments. For example, system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. In some embodiments program instructions stored in system memory 1020 may be executed by processor(s) 1010 to provide various functions of system 1000.

In other embodiments, various functions may be performed by software components executing in memory on another device and communicating with the illustrated system via inter-computer communication. Some or all of these software components or any data structures described herein may be stored (e.g., as instructions or structured data) in system memory 1020, in persistent storage, or may be stored on a non-transitory computer-readable medium or a portable article to be read by an appropriate drive. In some embodiments, instructions stored on a computer-accessible medium separate from system 1000 may be transmitted to system 1000 via transmission media or signals such as electrical, electromagnetic, or digital signals, conveyed via a communication medium such as a network or a wireless link. Various embodiments may further include receiving, sending or storing instructions or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

As described above, a camera module with integrated components has a reduced overall part count, and thus a simplified assembly process that is less prone to error. Furthermore, integrating the optical filter in the lens barrel, embedding the circuit board with the image sensor into the substrate, and mounting a lower portion of the lens barrel holder at least partially inside the substrate reduces the height of the camera module (i.e., results in a reduced camera module profile along the Z-axis and/or the optical axis). A camera module with embedded components is thus more desirable for mobile devices since the camera module occupies less physical space and has a low part count. Additionally, the reliability of the camera module is improved since the embedded components are sealed inside the camera module, thereby protecting the embedded components from damage.

What is claimed is:

1. A camera module, comprising:
a lens barrel holder;
an image sensor; and
a substrate comprising:
 a circuit board embedded in the substrate, wherein the circuit board comprises:
  a plurality of electrical components mounted on a first side of the circuit board, wherein the plurality of electrical components are not exposed outside the substrate;
  a plurality of electrical connections on another side of the circuit board, wherein the image sensor is mounted to the plurality of electrical connections; and
  an opening in the circuit board for light to pass through the circuit board to the image sensor;
 an upper opening, larger than the opening for light to pass through the circuit board, configured to receive, at least partially inside the substrate, a lower portion of the lens barrel holder; and
 a lower opening configured to receive the image sensor.

2. The camera module of claim 1, wherein the lens barrel holder comprises:
one or more extensions; and
an adhesive bond between the one or more extensions and the substrate;
wherein the one or more extensions comprise:
 a flange extending laterally around an outer circumference of the lens barrel holder; or
 a plurality of tabs extending from respective outer sides of the lens barrel holder.

3. The camera module of claim 1, wherein the plurality of electrical components are mounted in groups at respective corners of the circuit board.

4. The camera module of claim 1, wherein the upper opening comprises a circular hole, and wherein the lower portion of the lens barrel holder comprises a cylindrical portion configured to fit inside the circular hole.

5. The camera module of claim 1, wherein the lower opening comprises a rectangular hole, and wherein light passes through the lens barrel holder and the rectangular hole to the image sensor.

6. The camera module of claim 1, wherein the lens barrel holder is configured to hold a plurality of optical elements comprising one or more lens elements and at least one optical filter.

7. The camera module of claim 1, wherein the circuit board comprises one or more external electrical connections on a portion of the circuit board extending outside the substrate.

8. A multifunction device, comprising:
a central processing unit;
a memory coupled to the central processing unit; and
a camera module coupled to the central processing unit, wherein the memory stores program instructions executable by the central processing unit to control operation of the camera module, wherein the camera module comprises:
a lens barrel holder;
an image sensor; and
a substrate comprising:
 a circuit board embedded in the substrate, wherein the circuit board comprises:
  a plurality of electrical components mounted on a first side of the circuit board, wherein the plurality of electrical components are not exposed outside the substrate;
  a plurality of electrical connections on another side of the circuit board, wherein the image sensor is mounted to the plurality of electrical connections; and
  an opening in the circuit board for light to pass through the circuit board to the image sensor; and
 an upper opening, larger than the opening for light to pass through the circuit board, configured to receive, at least partially inside the substrate, a lower portion of the lens barrel holder.

9. The multifunction device of claim 8, wherein the lens barrel holder comprises:
one or more extensions; and
an adhesive bond between the one or more extensions and the substrate;
wherein the one or more extensions comprise:
 a flange extending laterally around an outer circumference of the lens barrel holder; or
 a plurality of tabs extending from respective outer sides of the lens barrel holder.

10. The multifunction device of claim 8, the plurality of electrical components are in mounted in groups at respective corners of the circuit board.

11. The multifunction device of claim 8, wherein the upper opening comprises a circular hole, and wherein the lower portion of the lens barrel holder comprises a cylindrical portion configured to fit inside the circular hole.

12. The device of claim 8, wherein the substrate further comprises a rectangular hole, and wherein light passes through the lens barrel holder and the rectangular hole to the image sensor.

13. The device of claim 8, wherein the lens barrel holder is configured to hold a plurality of optical elements comprising one or more lens elements and at least one optical filter.

14. The multifunction device of claim 8, wherein the circuit board comprises one or more external electrical connections on a portion of the circuit board extending outside the substrate.

15. A method of manufacturing a camera module, comprising:
forming a substrate comprising:
 embedding a circuit board in the substrate, wherein the circuit board comprises:
  a plurality of electrical components mounted on a first side of the circuit board, wherein the plurality of electrical components are not exposed outside;
  a plurality of electrical connections on another side of the circuit board; and an opening in the circuit board for light to pass through;

forming an upper opening, larger than the opening for light to pass through the circuit board, configured to receive, at least partially inside the substrate, a lower portion of a lens barrel holder; and forming a lower opening connected to the upper opening and configured to receive an image sensor;

mounting, in the lower opening of the substrate, the image sensor to the plurality of electrical connections of the circuit board; and mounting the lower portion of the lens barrel holder in the upper opening, wherein the lens barrel holder is configured for light to pass through the lens barrel holder to the image sensor.

16. The method of claim 15, wherein mounting the lower portion of the lens barrel holder in the upper opening comprises an active alignment process, and wherein the active alignment process comprises:

capturing, by the image sensor, a test image;

determining, based at least in part on the test image, a position of the lens barrel holder to focus the test image;

aligning the lens barrel holder within the upper opening of the substrate based on the determined position; and performing an initial cure of bonding material on the lens barrel holder in proximity to the upper opening.

17. The method of claim 16, further comprising performing, subsequent to the active alignment process, a secondary cure of the bonding material, wherein performing the secondary cure comprises performing a heat curing process.

18. The method of claim 16, wherein performing the initial cure comprises performing an ultraviolet (UV) curing process.

19. The method of claim 15, wherein mounting the lower portion of the lens barrel holder in the upper opening comprises bonding one or more extensions of an outer surface of the lens barrel holder to the substrate, and wherein the one or more extensions comprise:

a flange extending laterally around an outer circumference of the lens barrel holder; or a plurality of tabs extending from respective outer sides of the lens barrel holder.

20. The method of claim 15, wherein forming the substrate further comprises an injection molding process, wherein the injection molding process embeds the circuit board and the plurality of electrical components in the substrate, and wherein the plurality of electrical components are in groups at respective corners of the circuit board.

21. A camera module, comprising:

an image sensor;

a substrate comprising:

a circuit board embedded in the substrate, wherein the circuit board further comprises an opening for light to pass through the circuit board to the image sensor;

a lower opening configured to receive the image sensor; and an upper opening, larger than the opening for light to pass through the circuit board; and a lens barrel holder comprising:

a lower portion of the lens barrel holder configured to fit at least partially inside the upper opening of the substrate; and one or more extensions configured to extend on top of the substrate from a portion of the lens barrel holder above the lower portion.

22. The camera module of claim 21, wherein the lens barrel holder comprises an adhesive bond between the one or more extensions and the substrate, wherein the one or more extensions comprise:

a flange extending laterally around an outer circumference of the lens barrel holder; or a plurality of tabs extending from respective outer sides of the lens barrel holder.

23. The camera module of claim 21, wherein the upper opening comprises a circular hole, and wherein the lower portion of the lens barrel holder comprises a cylindrical portion configured to fit inside the circular hole.

24. The camera module of claim 21, wherein the lens barrel holder is configured to hold a plurality of optical elements comprising one or more lens elements and at least one optical filter.

25. The camera module of claim 21, wherein the lower opening comprises a rectangular hole, and wherein light passes through the lens barrel holder and the rectangular hole to the image sensor.

* * * * *